(12) United States Patent
Tanzi et al.

(10) Patent No.: US 12,443,036 B2
(45) Date of Patent: Oct. 14, 2025

(54) MOTOR VEHICLE

(71) Applicant: FERRARI S.P.A., Modena (IT)

(72) Inventors: Alessandro Tanzi, Modena (IT); Erik Masoero, Modena (IT); Pasquale Vitiello, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 18/330,070

(22) Filed: Jun. 6, 2023

(65) Prior Publication Data
US 2023/0400687 A1 Dec. 14, 2023

(51) Int. Cl.
| | |
|---|---|
| *G02B 27/01* | (2006.01) |
| *B60K 35/00* | (2006.01) |
| *G09G 3/00* | (2006.01) |
| *B60K 35/23* | (2024.01) |
| *B60K 35/28* | (2024.01) |
| *B60K 35/81* | (2024.01) |
| *B60K 37/20* | (2024.01) |

(52) U.S. Cl.
CPC ......... *G02B 27/0101* (2013.01); *B60K 35/00* (2013.01); *G09G 3/002* (2013.01); *B60K 35/23* (2024.01); *B60K 35/28* (2024.01); *B60K 35/81* (2024.01); *B60K 37/20* (2024.01); *B60K 2360/166* (2024.01); *B60K 2360/167* (2024.01); *B60K 2360/25* (2024.01); *B60K 2360/31* (2024.01); *G02B 2027/014* (2013.01); *G02B 2027/0141* (2013.01); *G09G 2380/10* (2013.01)

(58) Field of Classification Search
CPC ................ B60K 35/00; G02B 27/0101; G02B 2027/014; G02B 2027/0141; G02B 27/01; G09G 2380/10; G09G 3/00
See application file for complete search history.

(56) References Cited

U.S. PATENT DOCUMENTS

| | | | |
|---|---|---|---|
| 11,714,279 B2 * | 8/2023 | Murata | ................. B60K 35/00 |
| | | | 359/630 |
| 2006/0028733 A1 | 2/2006 | Aoki et al. | |
| | (Continued) | | |

FOREIGN PATENT DOCUMENTS

| | | | |
|---|---|---|---|
| DE | 102016124987 A1 * | 6/2018 | |
| FR | 2984533 A3 | 6/2013 | |
| | (Continued) | | |

OTHER PUBLICATIONS

Italian Search Report for Application No. 102022000012155; Filing Date: Jun. 8, 2022; Date of Mailing—Jan. 27, 2023, 7 pages.

*Primary Examiner* — Olga V Merkoulova
(74) *Attorney, Agent, or Firm* — CANTOR COLBURN LLP

(57) ABSTRACT

A motor vehicle is described comprising a passenger compartment; a dashboard arranged within said passenger compartment and delimiting the passenger compartment at the front with reference to a normal forward moving direction of the motor vehicle itself; a windshield delimiting said passenger compartment and contiguous with said dashboard; and a head-up display configured to project at least a first image containing an item of information accessory to the driving of the motor vehicle on a first region of the windshield; the head-up display comprises a projector housed in a second region of said dashboard, and the first region is defined by the windshield.

9 Claims, 3 Drawing Sheets

(56) References Cited

U.S. PATENT DOCUMENTS

| | | | |
|---|---|---|---|
| 2009/0201583 A1* | 8/2009 | Kamada | C03C 17/007 359/485.02 |
| 2009/0295681 A1* | 12/2009 | Kaminski | B32B 17/10165 428/426 |
| 2013/0141250 A1 | 6/2013 | Mathieu et al. | |
| 2014/0132852 A1* | 5/2014 | Pawusch | G02B 27/0149 349/11 |
| 2015/0165906 A1* | 6/2015 | Lee | B60K 35/10 345/8 |
| 2021/0300160 A1* | 9/2021 | Haïdar | B60J 3/06 |
| 2021/0316611 A1 | 10/2021 | Zachar et al. | |
| 2022/0128859 A1* | 4/2022 | Takahata | G02B 27/0101 |
| 2022/0146818 A1* | 5/2022 | Inoue | G02B 27/0149 |
| 2022/0236559 A1* | 7/2022 | Chen | G02B 17/002 |

FOREIGN PATENT DOCUMENTS

| | | | |
|---|---|---|---|
| JP | H08175225 A | 7/1996 | |
| WO | 2020235675 A1 | 11/2020 | |
| WO | WO-2021060402 A1 * | 4/2021 | G02B 27/0101 |

* cited by examiner

MOTOR VEHICLE

CROSS-REFERENCE TO RELATED APPLICATIONS

This patent application claims priority from Italian patent application no. 102022000012155 filed on Jun. 8, 2022, the entire contents of which is incorporated herein by reference.

TECHNICAL FIELD

The present invention relates to a motor vehicle.

BACKGROUND

Motor vehicles comprising a body defining a passenger compartment and a power unit are known.

The passenger compartment in turn comprises at least one pair of front seats and is delimited frontally by a dashboard and by a windshield which are arranged frontally at the front seats, with reference to a normal forward moving direction of the motor vehicle.

In a known manner, one of the front seats defines a driver's seat.

The dashboard comprises, in a known manner, an instrument panel arranged in a frontal position to the driver's seat and envisaged to provide the driver himself with information necessary for driving.

In greater detail, the instrument panel comprises, for example, a tachymeter indicating the instantaneous speed of the motor vehicle and a rev counter indicating the number of revolutions of a drive shaft of the power unit.

The instrument panel also comprises, in some embodiments, an indication of the residual amount of fuel, an indication of the temperature of a cooling liquid of the power unit, a clock and an odometer.

The dashboard comprises, in turn, a central portion housing a central display distinct from the instrument panel and adapted to display to the occupants accessory information not necessary for driving, such as for example information provided by the satellite navigator, information relating to connectivity and to the use of a mobile phone or information relating to the reproduction of audiovisual content within the passenger compartment.

The motor vehicles comprise, in a known manner, a supplementary head-up display.

The head-up display of known type is adapted to display supplementary virtual images representative of quantities characteristic of the state of the motor vehicle itself.

More precisely, optical systems are known from the geometric optics, such as for example the human eye capable of forming a real or virtual image representative of an object.

More in particular, the objects emit or diffuse a beam of light in all directions.

The optical system is formed by a plurality of reflecting and reflective surfaces capable of deflecting the rays of the beam of light coming from a point of the object in a point of the real or virtual image.

In doing so, the optical system determines an association between each point of the object and a corresponding point of the real or virtual image.

Each point of the object, in particular, emits a divergent beam of light from the object point itself.

The optical system alters the divergent beam of light from the object point in another beam which may be convergent or divergent.

When the rays emerging from the optical system associated with each point of the object actually intersect at the corresponding point in the image, the optical system provides a real image of the object.

Otherwise, when the prolongations of the rays emerging from the optical system associated with each point of the object intersect at the point of the image, the optical system provides a virtual image of the object.

The head-up displays of known type comprise, in turn:
a processing unit;
a projection unit controlled by the processing unit and adapted to generate a light beam; and
a plurality of mirrors arranged so as to reflect the light beam onto a windshield.

The windshield deflects the light beam.

The mirrors and the windshield form, in the solutions of known type, an optical system configured to form the virtual image externally to the windshield and at a not null distance from the windshield itself.

There is a perceived need in the sector to reduce or even eliminate the central display, while ensuring that the aforementioned accessory information is made available to the occupants of the motor vehicle.

There is furthermore a perceived need in the sector to make such accessory information available at all points in the passenger compartment without parallax effects.

There is also a perceived need in the sector to make such accessory information available only when it is actually necessary.

There is also a perceived need in the sector to allow the occupants of the motor vehicle to select the aforesaid information to be displayed.

There is also a perceived need in the sector to obtain maximum flexibility in the design of the geometric shapes of the central portion of the dashboard.

With particular reference to the high-end motor vehicles intended for both a conventional urban/suburban use and racing use on a track, there is furthermore a perceived need in the sector to make available to the occupants of the motor vehicle dedicated accessory information depending on the use of the motor vehicle itself.

Finally, there is also a perceived need in the sector to make this accessory information available to the occupants of the motor vehicle, even when the latter wear polarized glasses.

SUMMARY

Aim of the present invention is the realization of a motor vehicle, which allows to fulfil at least one of the aforementioned needs.

The above aim is achieved by the present invention, as it relates to a motor vehicle according to what is defined by claim 1.

BRIEF DESCRIPTION OF THE DRAWINGS

For a better understanding of the present invention, two preferred embodiments are described below, by way of non-limiting example only and with reference to the accompanying drawings, wherein.

DESCRIPTION OF EMBODIMENTS

Figure 1:
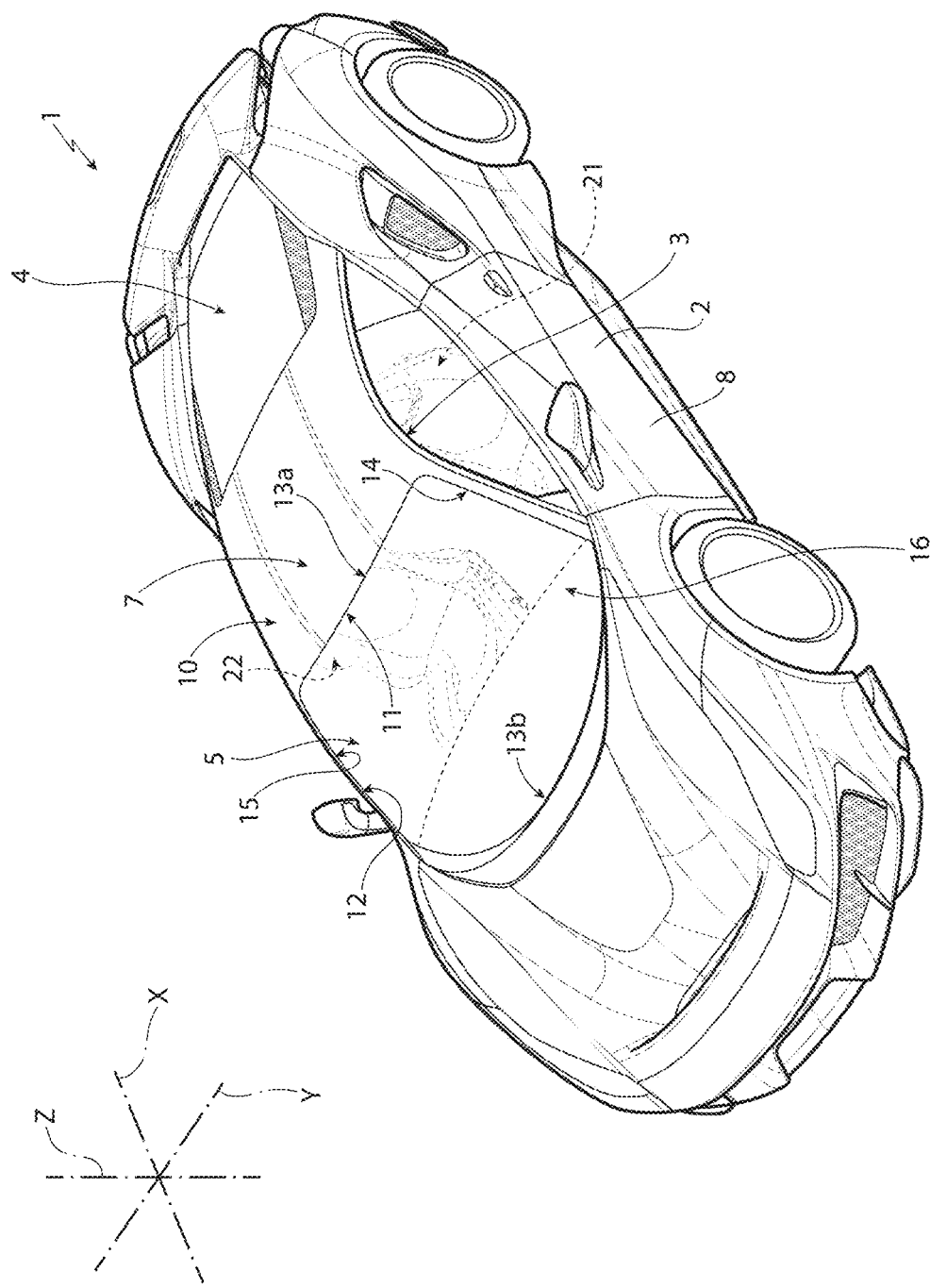
FIG. 1 is a perspective view of a motor vehicle realized according to the dictates of the present invention.

With reference to FIG. 1, 1 denotes a motor vehicle comprising a body 2 defining a passenger compartment 3 and a power unit 4 (only schematically shown in FIG. 1).

The motor vehicle 1 is a high-end motor vehicle intended for both a conventional urban/suburban use and racing use on a track.

It should be noted that in the remainder of this description, expressions such as "above", "below", "at the front", "at the back" and the like are used with reference to conditions of normal forward moving direction of the motor vehicle 1.

The motor vehicle 1 further comprises:
- a windshield 5 delimiting the passenger compartment 3 at the front;
- a backrest (not shown) delimiting the passenger compartment 3 at the back;
- a roof 7 delimiting the passenger compartment 3 above; and
- a pair of doors 8 hinged to the body 2 and movable between a closed position in which they delimit the passenger compartment 3 laterally and prevent the entry into/exit from the passenger compartment 3 and an open position in which they allow the entry into/exit from the passenger compartment 3.

It is also possible to define:
- a longitudinal axis X integral with the motor vehicle 1, arranged, in use, horizontal and parallel to a normal forward moving direction of the motor vehicle 1;
- a transverse axis Y integral with the motor vehicle 1, arranged, in use, horizontal and orthogonal to the axis X; and
- an axis Z integral with the motor vehicle 1 arranged, in use, vertical and orthogonal to the axes X, Y.

In greater detail, the windshield 5 comprises, in turn:
- a chassis 10 comprising a frame 11 defining an opening 12; and
- a front glazing 16 engaging the opening 12, supported by the frame 11 and arranged frontally with respect to a normal forward moving direction parallel to the direction X.

In greater detail, the frame 11 is quadrangular in shape and comprises:
- a pair of upper and lower cross members 13a, 13b opposite each other; and
- a pair of lateral pillars 14, 15, opposite each other and extending transversely between respective ends of the cross members 13a, 13b.

The cross members 13a, 13b have a prevalent extension parallel to the axis Y.

The cross member 13a is arranged rearwardly to the cross member 13b.

The motor vehicle 1 further comprises:
- a pair of front seats 21, 22 housed in the passenger compartment 3; and
- a dashboard 25 arranged below the windshield 5 and frontally at the seats 21, 22.

In particular, the seat 21 defines a driver's seat and the motor vehicle 1 comprises a steering wheel 24 protruding from the dashboard 25 towards the seat 21.

The dashboard 25 comprises an end region contiguous to the glazing 16 and known in the art as "valence panel".

The region 26 is, in the shown case, curved.

The motor vehicle 1 further comprises a head-up display configured to display a plurality of virtual images 29, 51, 52 on a region 19.

The term "virtual images" refers to images whose points correspond to the prolongation of the light rays generated by the head-up display 30.

Figure 2:
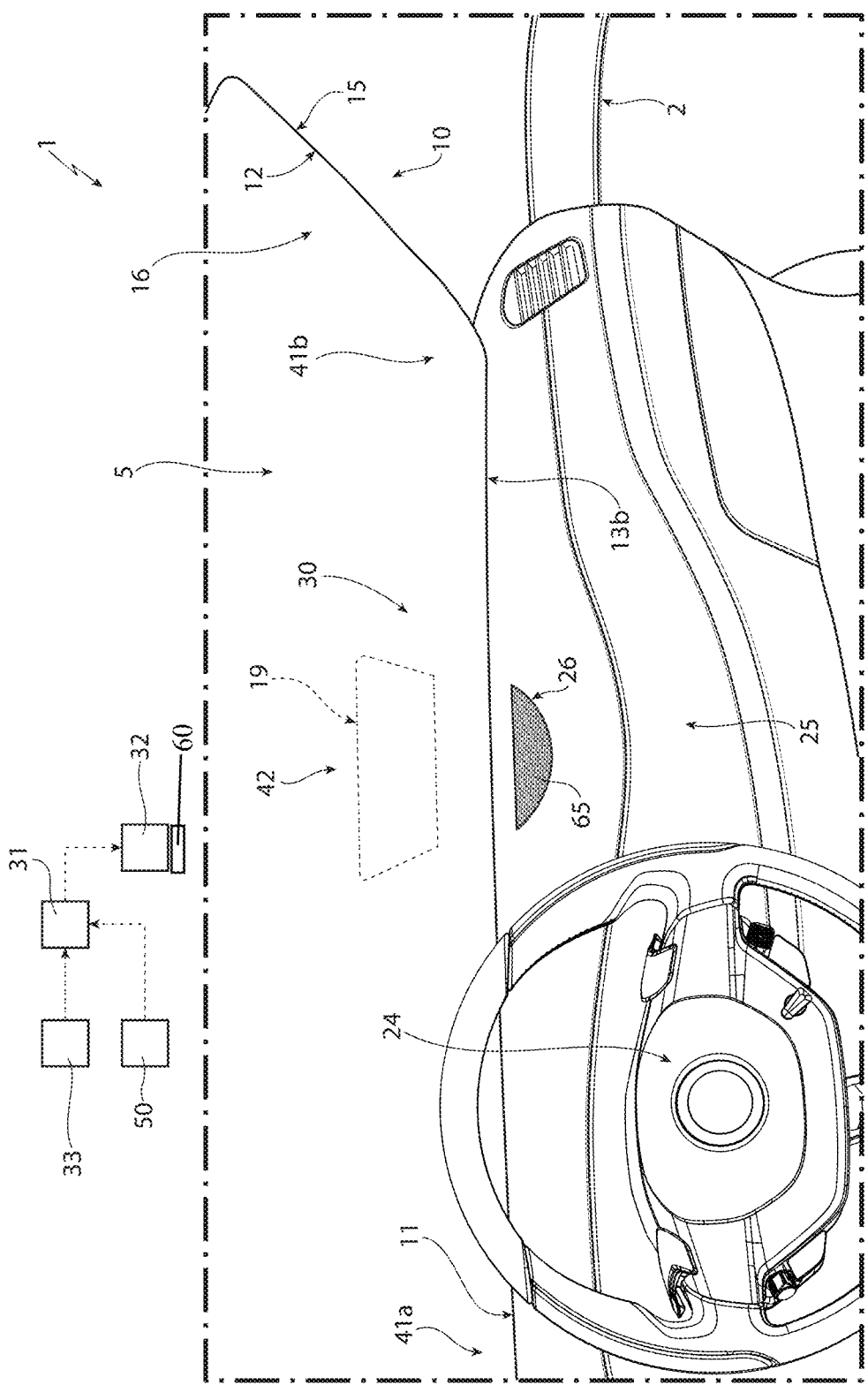
FIG. 2 is a view of a front portion of a passenger compartment of the motor vehicle of FIG. 1, in a first operating position and with parts removed for clarity's sake.
Figure 3:
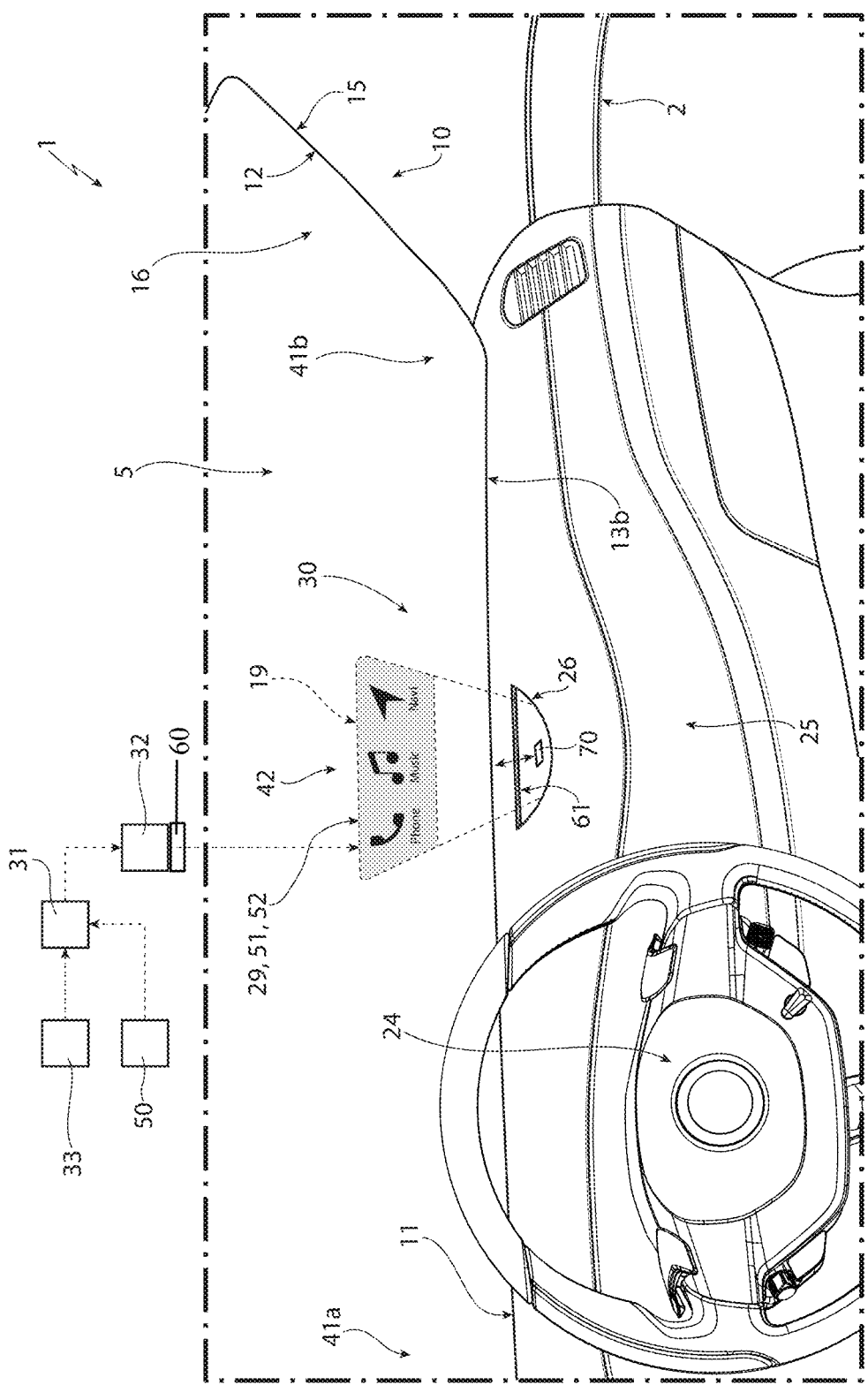
FIG. 3 shows the front portion of FIG. 2, in a second operating position and with parts removed for clarity's sake.

Advantageously, the head-up display 30 comprises a projection unit 32 housed in a region 26 of the dashboard 25 and the region 19 is defined by the windshield 5 (FIGS. 2 and 3).

In other words, the head-up display 30 forms the images 29, 51, 52 on the region 19 of the windshield 5 itself and, so, the images 29, 51 are located at null distance from the windshield 5 itself.

In particular, the images 29, 51, 52 are not simply reflected from the region 19, but are formed on the region 19 itself, i.e. they are focused exactly on the region 19 of the windshield 5.

The projection unit 32 is optically facing the region 19 and is adapted to project a light beam onto the windshield 5.

The region 19 is transparent.

With reference to FIGS. 2 and 3, the head-up display 30 further comprises:
- a processing unit 31 programmed to control the projection unit 32; and
- a control device 33 (only schematically shown), for example a knob or a voice receiver, operatively connected with the processing unit 31, and selectively operable to activate/deactivate the projection unit 32.

In greater detail, the processing unit 31 is programmed to cause the projection unit 32 to form the images 29, 51, 52 having characteristics selectable both on the basis of the preferences of the occupants of the motor vehicle 1 and on the basis of the use on the road or on the track of the motor vehicle 1.

The head-up display 30 further comprises a polarized film 60 applied on the projection unit 32.

The film 60 allows, in particular, the display of the images 29, 51, 52 even wearing polarized glasses.

The dashboard 25 extends between the pillars 14, 15.

Preferably, the region 26 is arranged in a median region of the dashboard 25 equidistant from the pillars 14, 15.

In a preferred embodiment, the dashboard 25 defines a compartment 70 for housing the projection unit 32.

The dashboard 25 further comprises a covering element selectively movable, following the actuation of the control device 33, between:
- a first position (FIG. 2), in which it is extracted from a seat 61 of the dashboard 25 itself and completely covers the compartment 70 so as to be interposed between the projection unit 32 and the region 19 of the windshield 5; and
- a second position (FIG. 3), in which it is housed within a seat 61 of the dashboard 25 itself and leaves the compartment 70 uncovered so as to leave the projection unit 32 facing the region 19 of the windshield 5.

The processing unit 31 is programmed to cause the movement of the covering element 65 between the aforesaid first and second positions, following the actuation of the control device 33.

In particular, the covering element 65 is slidable between the aforesaid first and second positions.

The compartment 70 is arranged below the region 26.

The glazing 16 comprises, in turn:
- a pair of lateral areas 41a, 41b each adjacent to a relative pillar 14, 15; and a central area 42 interposed between the areas 41a, 41b and defining the region 26.

In particular, the area 41a is arranged frontally at the seat 11 and the area 41b frontally at the seat 12.

The images 29, 51, 52 relate to accessory information distinct from the aforesaid information which is not necessary for driving.

For example, the images 29 relate to information provided by the satellite navigator, information relating to connectivity and to the use of a mobile phone or information relating to the reproduction of audiovisual content within the passenger compartment.

The processing unit 31 is programmed to place the covering element 65 in the second position and to control the projection of the images 29 in case of activation request by the occupants of the motor vehicle 1.

The processing unit 31 is programmed, both during an urban/suburban use of the motor vehicle 1 and during use of the motor vehicle 1 on the track, to place the covering element 65 in the first position and deactivate the projection unit 32, in case of deactivation request by the occupants of the motor vehicle 1.

The processing unit 31 is also programmed, during use of the motor vehicle 1 on the road, to cause the projection group 32 to form on the region 19 a plurality of virtual images 51 representative of the surroundings of the car 1.

In a preferred embodiment, the motor vehicle 1 comprises a pair of cameras 50 (only schematically shown in FIGS. 2 and 3) adapted to acquire images representative of the scenario surrounding laterally and posteriorly the motor vehicle 1 itself.

In such a preferred embodiment, the processing unit 31 is programmed to receive from the camera 50 a signal representative of the surroundings of the car 1, and to cause the projection unit 32 to form the images 51 on the region 19 of the windshield 5.

Preferably, the processing unit 31 is programmed to cause the projection unit 32 to project, during use of the motor vehicle 1 on the track, further images 52 on the region 19 of the windshield 5.

In a non-limiting manner, the images 52 may relate to information exchanged with the box and/or to information exchanged with the racing management and/or to information exchanged with a copilot located in a remote position from the motor vehicle 1.

The images 52 may further be related to information relating to the track, such as for example time history, path statistics, etc.

The operation of the motor vehicle 1 is firstly described with reference to an urban/suburban use and to a condition in which the covering element 65 is in the first position (FIG. 3). The covering element 65 is further extracted from the seat 61 and covers the compartment 70 so as to be interposed between the projection unit 32 and the region 19 of the windshield 5.

The crew activates the head-up display 30 via the control device 33.

The head-up display 30 forms the images 29, 51 on the region 19 of the windshield 5.

By means of the control device 33, it is also possible to select the nature and the characteristics of the information represented by means of the images 29, 51, on the basis of the preferences of the occupants of the motor vehicle 1.

Consequently, the covering element 65 slides until reaching the second position (FIG. 2) in which it is housed within a seat 61 of the dashboard 25 itself and leaves the compartment 70 uncovered so as to leave the projection unit 32 of the head-up display 30 facing the region 19 of the windshield 5.

The images 29 relate to accessory information not necessary for driving, such as for example information provided by the satellite navigator, information relating to connectivity and to the use of a mobile phone or information relating to the reproduction of audiovisual content within the passenger compartment.

The crew and in particular the driver have visual access to these images 29 without looking away from the windshield 5.

In a preferred embodiment, the head-up display 30 is operable to project onto the region 19 the images 51 corresponding to the images acquired by the cameras 50 and representative of the scenario surrounding laterally and posteriorly the motor vehicle 1 itself.

With reference to the use of the motor vehicle 1 on the track, following the actuation of the control device 33, the head-up display 30 forms further images 52 on the region 19 of the windshield 5.

In a non-limiting manner, the images 52 may relate to information exchanged with the box and/or to information exchanged with the racing management and/or to information exchanged with a copilot located in a remote position from the motor vehicle 1.

The images 52 may further be related to information relating to the track, such as for example time history, path statistics, etc.

The crew deactivates the head-up display 30 via the control device 33.

Following such deactivation, the covering element 65 returns from the second position (FIG. 2) to the first position (FIG. 3).

From an examination of the present invention, the advantages that it allows to be obtained are evident.

In greater detail, the projector 32 is housed in the region 26 of the dashboard 25, and the region 19 is defined by the windshield 5.

In this way, it is possible on the one hand to reduce or even completely eliminate the central display from the dashboard 25, providing on the other hand the accessory information not necessary for driving by means of the images 29, 51, 52 projected onto the region 19 of the windshield 5.

It is thus possible to increase the freedom of the designer in the conception of the geometries and of the dimensions of the dashboard 25, without penalizing the driving comfort.

Moreover, the aforementioned information on the state of the motor vehicle 1 is made available to the crew only following the activation of the control device 33, i.e. only when it is actually necessary for safe driving.

Thanks to the fact that the images 29, 51 are formed on the region 19 of the windshield 5, the driver can acquire the respective information substantially without looking away from the windshield 5 itself and with a limited risk of distraction that could cause accidents.

Moreover, the images 29, 51, 52 are virtual images that are formed on the windshield 5. Therefore, the images 29, 51, 52 are correctly perceived from any point of the motor vehicle 1, without any parallax effect.

The nature and the characteristics of the information represented by the images 29, 51, 52 can be selected by appropriately programming the processing unit 31, thus allowing such information to be personalized both on the basis of the preferences of the occupants of the motor vehicle 1 and on the basis of the use on the road or on the track of the motor vehicle 1.

The film 60 allows the correct display of the images 29, 51, 52 to the occupants of the motor vehicle 1, even when the latter wear polarized glasses.

Finally, it is clear that modifications and variations can be made to the motor vehicle 1 made according to the present invention, which however do not fall outside the scope of protection defined by the Claims.

In particular, the projection unit 32 could comprise a light-emitting diode display or a liquid crystal display placed in its focus.

The dashboard 25 could comprise an instrument panel arranged frontally at the seat 21 and at the front of the steering wheel 24.

The instrument panel would be envisaged to make available to the driver the information necessary for driving, such as the instantaneous speed of the motor vehicle and a rev counter indicating the number of revolutions of a drive shaft of the power unit.

The dashboard 25 could not comprise the covering element 65.

The invention claimed is:

1. A motor vehicle comprising:
   a passenger compartment;
   a dashboard arranged within said passenger compartment and delimiting said passenger compartment at the front with reference to a normal forward moving direction of said motor vehicle;
   a windshield delimiting said passenger compartment and contiguous with said dashboard; and
   a head-up display configured to form at least one first virtual image containing an item of information accessory to the driving of said motor vehicle focused on a first region at a null distance from the windshield itself, wherein the windshield and the first region are transparent, and wherein the first region is in a light of sight for driving the vehicle such that the occupants can view the item of information accessory without looking away from the windshield;
   wherein said head-up display comprises a projection unit housed in a second region of said dashboard and a polarized film applied to the projection unit to permit display of the images to occupants of the vehicle even when wearing polarized glasses, wherein the projection unit projects and focusses a light beam onto the first region of the windshield, and wherein said first region is defined by said windshield.

2. The motor vehicle according to claim 1, wherein said second region defines a compartment of said dashboard.

3. The motor vehicle according to claim 2, wherein said passenger compartment comprises a plurality of pillars spaced apart from one another, between which said windshield extends;
   said windshield comprising, in turn:
   a central area defining said first region and capable of facing said projector; and
   a first and a second end area opposite one another and delimited by respective segments of corresponding pillars;
   one of said seats defining a driver's seat arranged on the side of said first area.

4. The motor vehicle according to claim 2, wherein said dashboard comprises a covering element selectively movable between:
   a first position, in which it covers said compartment; and
   a second position, in which it leaves said compartment open, so as to place said projection unit in a position facing said second region.

5. The motor vehicle according to claim 1, wherein said head-up display further comprises a processing unit programmed to control said projection unit.

6. The motor vehicle according to claim 5, wherein said processing unit comprises detection means configured to acquire a signal representative of the surroundings of said motor vehicle;
   said processing unit being operatively connected to said detection means.

7. The motor vehicle according to claim 6, wherein said processing unit is programmed, in case of urban or suburban use, to cause said projector to form a second virtual image associated with said signal on said first region.

8. The motor vehicle according to claim 5, wherein said processing unit is programmed, in case of racing use on a track, to cause said projector to form a third virtual image with a further item of information associated with the course of a competition and/or simulating, in use, a copilot.

9. The motor vehicle according to claim 8, wherein said head-up display is further configured to form said third image on said first region.

* * * * *

UNITED STATES PATENT AND TRADEMARK OFFICE
CERTIFICATE OF CORRECTION

| | | |
|---|---|---|
| PATENT NO. | : 12,443,036 B2 | Page 1 of 1 |
| APPLICATION NO. | : 18/330070 | |
| DATED | : October 14, 2025 | |
| INVENTOR(S) | : Alessandro Tanzi et al. | |

It is certified that error appears in the above-identified patent and that said Letters Patent is hereby corrected as shown below:

On the Title Page

Insert:
--(30) Foreign Application Priority Data
June 8, 2022 (IT) .................. 102022000012155--

Signed and Sealed this
Thirteenth Day of January, 2026

John A. Squires
*Director of the United States Patent and Trademark Office*